United States Patent
Yamauchi et al.

(10) Patent No.: US 10,357,048 B2
(45) Date of Patent: Jul. 23, 2019

(54) NON-ALCOHOLIC BEER-TASTE BEVERAGE

(71) Applicant: Suntory Holdings Limited, Osaka-shi, Osaka (JP)

(72) Inventors: Yuto Yamauchi, Ibaraki (JP); Itsuki Iriuchijima, Tokyo (JP)

(73) Assignee: SUNTORY HOLDINGS LIMITED, Osaka-shi (JP)

( * ) Notice: Subject to any disclaimer, the term of this patent is extended or adjusted under 35 U.S.C. 154(b) by 52 days.

(21) Appl. No.: 15/557,508

(22) PCT Filed: Mar. 4, 2016

(86) PCT No.: PCT/JP2016/056761
§ 371 (c)(1),
(2) Date: Sep. 12, 2017

(87) PCT Pub. No.: WO2016/147907
PCT Pub. Date: Sep. 22, 2016

(65) Prior Publication Data
US 2018/0042272 A1    Feb. 15, 2018

(30) Foreign Application Priority Data

Mar. 13, 2015  (JP) ................. 2015-051269
Oct. 29, 2015  (JP) ................. 2015-212646

(51) Int. Cl.
| A23L 2/38 | (2006.01) |
| A23L 2/54 | (2006.01) |
| A23L 2/66 | (2006.01) |
| A23L 2/68 | (2006.01) |
| A23L 2/56 | (2006.01) |
| A23L 2/72 | (2006.01) |

(52) U.S. Cl.
CPC ............... *A23L 2/38* (2013.01); *A23L 2/54* (2013.01); *A23L 2/56* (2013.01); *A23L 2/66* (2013.01); *A23L 2/68* (2013.01); *A23L 2/72* (2013.01); *A23V 2002/00* (2013.01)

(58) Field of Classification Search
CPC ..... A23L 2/38; A23L 2/56; A23L 2/54; A23L 2/66; A23V 2002/00
USPC .................... 426/11, 14, 590, 592, 600
See application file for complete search history.

(56) References Cited

U.S. PATENT DOCUMENTS

| 2014/0220179 A1 | 8/2014  | Matsui et al. |
| 2014/0220216 A1 | 8/2014  | Sato |
| 2014/0308425 A1 | 10/2014 | Teranishi et al. |
| 2014/0328993 A1 | 11/2014 | Teranishi et al. |
| 2016/0175241 A1 | 6/2016  | Scarci et al. |
| 2016/0309754 A1 | 10/2016 | Teranishi et al. |

FOREIGN PATENT DOCUMENTS

| JP | 2008-271942 A | 11/2008 |
| JP | 2012-50382 A  | 3/2012  |
| JP | 2012-244971 A | 12/2012 |
| JP | 2013-81418 A  | 5/2013  |
| JP | 2013-236616 A | 11/2013 |
| JP | 2014-168383 A | 9/2014  |
| JP | 2015-862 A    | 1/2015  |
| TW | 201334709 A1  | 9/2013  |
| WO | 2013/077055 A1| 5/2013  |
| WO | 2014/038546 A1| 3/2014  |
| WO | 2015/18792 A1 | 2/2015  |
| WO | 2015/029605 A1| 3/2015  |

OTHER PUBLICATIONS

International Search Report dated May 31, 2016, issued in counterpart International Application No. PCT/JP2016/056761. (2 pages).
Office Action dated Mar. 9, 2017, issued in counterpart Taiwanese Application No. 105107587. (5 pages).
Office Action dated Mar. 13, 2019, issued in counterpart JP application No. 2015-212646, with English translation. (5 pages).

*Primary Examiner* — Helen F Heggestad
(74) *Attorney, Agent, or Firm* — Westerman, Hattori, Daniels & Adrian, LLP

(57) ABSTRACT

A beer-taste beverage which is substantially nonalcoholic, containing (A) a collagen peptide having an average molecular weight of from 500 to 8,000, (B) a carbon dioxide gas, (C) an iso-α acid, and (D) an acidulant, wherein a pH is 3 or more and 4 or less, and wherein the content of the collagen peptide is from 280 to 1,800 mg/100 mL, and wherein the content of the iso-α acid is from $1.0 \times 10^{-3}$ to $3.0 \times 10^{-3}$% by mass. The beer-taste beverage of the present invention has excellent initial tastes of sour taste and bitterness and has beer-like taste, so that the beer-taste beverage can provide a new taste as luxury products.

7 Claims, No Drawings

NON-ALCOHOLIC BEER-TASTE BEVERAGE

TECHNICAL FIELD

The present invention relates to a beer-taste beverage which is substantially nonalcoholic.

BACKGROUND ART

Collagens have been conventionally widely used as gelatins in the field of foods. Collagens, which are animal proteins, are main ingredients of dermis, connective tissues, or the like, so that the collagens have been in the limelight also in the aspects of medical fields or cosmetic fields in the recent years.

In general, it is considered to be difficult to efficiently utilize the ingested collagens in a body even when collagens having large molecular weights are orally ingested. However, in the recent years, collagen peptides in which high-molecular collagens are formed into low-molecular compounds to be suitably ingestible in a body have been developed, and beverages containing collagen peptides have also been developed.

Beverages containing collagen peptides as mentioned above have been classified as refreshing beverages, to which heat treatment has been carried out for the purpose of sterilization. The sterilization conditions are differentiated depending upon the pHs of beverages according to the Food Sanitation Act in Japan (Ministry of Health and Welfare, Announcement No. 213). It is described in the Food Sanitation Act as the production standards for those requiring sterilization, but without storage standards, that the sterilization for those at a pH of lower than 4.0 includes a method of heating a central part temperature to 65° C. for 10 minutes or a method equivalent or better thereof; and the sterilization for those at a pH of from 4.0 to 4.6 includes a method of heating at 85° C. for 30 minutes or a method equivalent or better thereof.

Regarding collagen peptide-containing beverages, Patent Publication 1 discloses a beverage composition realizing an appropriate sour taste and excellent flavor within a pH range of a pH 4.0 or lower which is effective for anti-corrosion, by including two or more kinds of acidulants including phosphoric acid to adjust its pH to 4.0 or lower. On the other hand, collagen peptides have been tried to be blended into beer-taste beverages. Patent Publication 2 discloses a technique in which the texture of foams in Happoshu is made even finer to keep rigidity of the foams even firmer, so that the foams would not disappear over a long period of time, thereby keeping a lingering taste of the Happoshu.

RELATED ART REFERENCES

Patent Publications

Patent Publication 1: Japanese Patent Laid-Open No. 2013-081418
Patent Publication 2: Japanese Patent Laid-Open No. 2008-271942

SUMMARY OF THE INVENTION

Problems to be Solved by the Invention

In general, taste (teimi) changes with the passage of time after taking and holding a beverage in the mouth, and sour taste and bitterness tastes that are sensed as initial tastes immediately after the ingestion, and among the initial tastes the bitterness is sensed earlier than the sour taste. In view of the above, as a result of detailed studies on the taste of a nonalcoholic beer-taste beverage in which a collagen peptide is blended, the present inventors have found that there are some drawbacks that the collagen peptide may undesirably make the initial tastes flat and monotonous in tastes.

In addition, the collagen peptides have been known to have a pH buffering ability. Therefore, in a case where a collagen peptide is contained in the beverage, the influences of the pH buffering ability are not negligible. As a result of trying to design beverages that contain a collagen peptide and have a pH of 4.0 or lower, from the viewpoint of not wanting to give large thermal loads to beverages in order to maintain flavors, the present inventors have found that an acidulant is needed to be used in a large amount in order to lower its pH, whereby consequently giving sensory results in which sour taste is started to be sensed in delay among the tastes of the initial tastes that are flat and monotonous, thereby undesirably giving a highly disagreeable flavor as a so-called beer-taste beverage.

Therefore, an object of the present invention is to provide a beer-taste beverage which is substantially nonalcoholic that realizes an excellent flavor, while containing a collagen peptide, within a pH range of a pH 4 or lower.

Means to Solve the Problems

As a result of advancement in intensive studies, the present inventors have found that blending of an iso-α acid in a specified amount in a beverage greatly influences the improvement in taste of initial tastes. Iso-α acids give taste as bitterness that is sensed earlier than sour taste among the initial tastes, and it has been found that the addition of a specified amount of an iso-α acid not only exhibits an effect of accenting a first half of the initial tastes but also influences taste in a second half of the initial tastes, which gives an excellent balance of a second half of the initial tastes in combination with an acidulant.

Specifically, the present invention relates to a beer-taste beverage which is substantially nonalcoholic, containing (A) a collagen peptide having an average molecular weight of from 500 to 8,000, (B) a carbon dioxide gas, (C) an iso-α acid, and (D) an acidulant, wherein a pH is 3 or more and 4 or less, and wherein the content of the collagen peptide is from 280 to 1,800 mg/100 mL, and wherein the content of the iso-α acid is from $1.0 \times 10^{-3}$ to $3.0 \times 10^{-3}$% by mass.

Effects of the Invention

According to the present invention, in a beer-taste beverage which is substantially nonalcoholic that contains a collagen peptide, a beer-taste beverage which has initial tastes with excellent balance in sour taste and bitterness within a pH range of a pH 4 or lower, and has beer-like taste can be provided.

Modes for Carrying Out the Invention

The beer-taste beverage which is substantially nonalcoholic according to the present invention is characterized in that the beverage contains a specified amount of an iso-α acid in a beverage containing a collagen peptide, within a pH range of a pH 3 or more and 4 or less.

The beer-taste beverage according to the present invention contains (A) a collagen peptide. The collagen peptide in the present invention refers to a collagen peptide which is hydrolytically treated so that an average molecular weight is 8,000 or less. By including not a simple collagen but a collagen peptide, its absorbability into the body is increased when orally ingested, so that in the present invention concerning a beverage, a collagen peptide is used. The average molecular weight of the collagen peptide has an upper limit of 8,000 or less, preferably 7,000 or less, more preferably 6,000 or less, and even more preferably 5,500, from the viewpoint of increasing its absorbability into the body when orally ingested. In addition, the average molecular weight has a lower limit of 500 or more, preferably 1,000 or more, more preferably 1,500 or more, and even more preferably 2,000 or more, in consideration of viscosity from the viewpoint of giving an appropriate body feel in a beer-taste beverage which is substantially nonalcoholic. The average molecular weight may be a range of a combination of any of those. For example, the average molecular weight of the collagen peptide is from 500 to 8,000, preferably from 1,000 to 7,000, more preferably from 1,500 to 6,000, and even more preferably from 2,000 to 5,500.

In the present specification, the average molecular weight of the collagen peptide means a value measured by gel permeation chromatography (GPC: standards are polyethylene glycols (PEG)), and in a case of a commercially available product, the average molecular weight may rely to the information of the manufactured articles provided by the supplier.

The average molecular weight by GPC is calculated based on a calibration curve showing the relationship between a retention time obtained by measurement of several kinds of polyethylene glycols (PEGs) of which molecular weights are already known and distinct under the same conditions, and a molecular weight. The average molecular weight in the present invention refers to a weight-average molecular weight calculated by PEG conversion according to this method.

The collagen peptide of the present invention can be obtained by hydrolyzing gelatin with an enzyme, an acid, or the like. The collagen peptide is a protein richly containing glycine or hydroxyproline, and the collagen peptide is also available as a commercially available product. The collagen is not particularly limited, and the collagen may be a collagen extracted from a collagen tissue of a mammal, or a collagen extracted from a collagen tissue of fish. It is preferable that the collagen is originated from fish, from the viewpoint of commercial product impression, safety, and the like. The raw materials for the collagen originated from fish may be sea fish or freshwater fish, including skins of tuna (*Thunnus albacares*), shark, cod, Bastard halibut (*hirame*) (*Paralichthys olivaceous*), righteye founders (*karei*) (fish of Pleuronectiformes), sea bream, tilapia, salmon, silurid, or the like. These collagens originated from fish are extracted from scales or skins of fish. The raw materials for the collagens originated from mammals include pigs, cows and bulls, and the like.

The content of the collagen peptide of the present invention is from 280 to 1,800 mg per 100 mL of a beverage. When the content of the collagen peptide exceeds 1,800 mg/100 mL, unpleasant odors originated from a collagen peptide might be felt in the nonalcoholic beer-taste beverage in some cases. On the other hand, when the content of the collagen peptide is less than 280 mg/100 mL, the effects of the present invention corresponding to a pH buffering ability owned by the collagen peptide are reduced. The content of the collagen peptide is preferably 350 mg/100 mL or more, more preferably 400 mg/100 mL or more, and even more preferably 500 mg/100 mL or more, and the content is preferably 1,500 mg/100 mL or less, more preferably 1,200 mg/100 mL or less, and even more preferably 1,000 mg/100 mL or less. In addition, the content is preferably from 350 to 1,500 mg/100 mL, more preferably from 400 to 1,200 mg/100 mL, and even more preferably from 500 to 1,000 mg/100 mL. In addition, the content of the collagen peptide can be analyzed by General Incorporated Foundation, Japan Food Research Laboratories, whereby the concentration of the collagen peptide can also be measured.

The beer-taste beverage according to the present invention contains a hydroxyproline. The hydroxyproline is a characteristic amino acid in the collagen, and in the present invention, it is preferable that the hydroxyproline is originated from (A) the collagen peptide. The content of the hydroxyproline can be measured by various methods. As one example, the content can be measured in accordance with a method by Nayama, Shibata, Ohtuki, and Saito (D. FUJIMOTO, H. NAGAI (1985), Collagen Experimental Method, pp. 51-56, Kodansha Publishing). In addition, the content may also be entrusted and measured by General Incorporated Foundation, Japan Food Research Laboratories. The content of the hydroxyproline in the beer-taste beverage of the present invention is preferably 30 mg/100 mL or more, more preferably 36 mg/100 mL or more, and even more preferably 42 mg/100 mL or more. In addition, the content is preferably 193 mg/100 mL or less, more preferably 161 mg/100 mL or less, and even more preferably 128 mg/100 mL or less.

In addition, the beer-taste beverage of the present invention contains (B) a carbon dioxide gas. It is preferable that (B) the carbon dioxide gas to be injected is such that a concentration of a carbon dioxide gas of the beverage of the present invention is 0.4 w/w % or more, from the viewpoint of giving accent to the flatness of the initial tastes caused by the collagen peptide, and giving a beer-taste feel in the overall taste. In addition, since the stimulations become stronger with an increase in the carbon dioxide gas concentration and the initial tastes are accented, the carbon dioxide gas concentration is preferably from 0.40 to 0.60 w/w %, more preferably from 0.45 to 0.55 w/w %, and even more preferably from 0.48 to 0.52 w/w %.

The gas concentration can be measured by a standard method which has been well known to one of ordinary skill in the art. In the measurement, a conventional technique of automatic measurement apparatus may also be used. For example, an apparatus for measuring gas volume GVA-500A (KYOTO ELECTRONICS MANUFACTURING CO., LTD.) can be used. The gas content in the beer-taste beverage is usually expressed by weight % (w/w % or g/kg), or can be expressed by a gas pressure at 20° C. ($kgf/cm^2$ or MPa). The carbon dioxide gas concentration and the gas pressure are properly convertible. In the present specification, the carbon dioxide gas content is expressed by a concentration (w/w %), unless specified otherwise.

The beer-taste beverage according to the present invention contains (C) an iso-α acid. The iso-α acid is a bitterness ingredient originated from hops which are raw materials used in the manufacture of beer, and the iso-α acid is an ingredient in which an α acid is isomerized. The bitterness of the iso-α acid contributes to give a beer-taste feel of the beverage. In the beer-taste beverage of the present invention, (C) an iso-α acid is primarily originated from hops, and extracts from hops may be blended, or a commercially available iso-α acid preparation may be blended. The means of extracting hops can be used without any limitations so long as it is a known technique. In addition, one or more of the means can be used in combination.

Iso-α acids can be measured in accordance with Method 7.7 of "Analytica-EBC" prescribing an analysis method published by the EBC (European Brewery Convention). The iso-α acids as used herein can be measured in accordance with any of methods so long as the methods are known. The content of the iso-α acid in the beer-taste beverage of the present invention is $1.0\times10^{-3}$% by mass or more to $3.0\times10^{-3}$% by mass or less, the content is preferably $1.3\times10^{-3}$% by mass or more, and more preferably $1.5\times10^{-3}$% by mass or more, from the viewpoint of accenting flatness in the first half of the initial tastes, thereby realizing an excellent quality flavor balance. In addition, the content is preferably $2.5\times10^{-3}$% by mass or less, and more preferably $2.0\times10^{-3}$% by mass or less, from the viewpoint of making the flavor balance of the second half of the initial tastes excellent.

The beer-taste beverage according to the present invention contains (D) an acidulant. As the acidulant, one or more acids selected from the group consisting of citric acid, lactic acid, phosphoric acid, and malic acid are preferably used. In addition, in the present invention, as an acid other than the above acids, succinic acid, tartaric acid, fumaric acid, glacial acetic acid and the like can be used. These can be used without limitations so long as the acids are accepted to be added to foods. In the present invention, it is preferable to use a combination of lactic acid from the viewpoint of appropriately giving a moderate sour taste, and phosphoric acid from the viewpoint of appropriately giving an sour taste with stimulating feel.

The content of the acidulant in the beer-taste beverage of the present invention, calculated as citric acid, is preferably 1,000 ppm or more, more preferably 1,200 ppm or more, and even more preferably 1,400 ppm or more. In addition, the content is preferably 3,000 ppm or less, more preferably 2,500 ppm or less, and even more preferably 2,000 ppm or less. When plural acids are used, the content means a total content. Here, the content calculated as citric acid as used herein refers to an amount converted from an acidity of various acidulants on the basis of the acidity of citric acid, and, for example, a content equivalent to 100 ppm of lactic acid, calculated as citric acid, is 120 ppm, a content equivalent to 100 ppm of phosphoric acid, calculated as citric acid, is 200 ppm, and a content equivalent to 100 ppm of malic acid, calculated as citric acid, is 125 ppm.

The content mass ratio of the iso-α acid to the acidulant (iso-α acid/acidulant) is preferably from 0.003 to 0.030, more preferably from 0.003 to 0.019, even more preferably from 0.005 to 0.017, and even more preferably from 0.008 to 0.014, from the viewpoint of accenting the flatness of the initial tastes caused by the collagen peptide, and giving a beer-taste feel in the overall taste.

The beer-taste beverage according to the present invention can be produced in the same manner as a general nonalcoholic beer-taste beverage except that a collagen peptide is used. Hereinbelow, the steps for producing a general non-fermented nonalcoholic beer-taste beverage will be shown as follows. By not including the fermentation step with an yeast, a nonalcoholic beer-taste beverage such as a nonalcoholic beer can be easily produced. General non-fermented nonalcoholic beer-taste beverages include those using malts as raw materials and those without malts, each of which can be produced as follows.

The nonalcoholic beer-taste beverage produced using malts as raw materials is produced as follows. First, to a mixture containing raw materials such as barleys such as malts, and optionally other grains and maize (corns), starches, sugars, a bittering agent, or a colorant, and water, an enzyme such as amylase is added to carry out gelatinization or saccharification, followed by filtration, to give a saccharified solution. Hops or a bittering agent or the like is optionally added to the saccharified solution, the mixture is boiled, and solid contents such as coagulant proteins are removed in a clearing tank. As a substitute of this saccharified solution, hops may be added to a solution prepared by adding hot water to a malt extract, and the mixture may be boiled. Hops may be mixed at any of stages from the beginning of boiling to before the termination of boiling. As the conditions in the saccharification step, the boiling step, the solid content removal step or the like, conditions that are known may be employed. After boiling, a wort obtained is filtered, and a carbon dioxide gas is added to a filtrate obtained. Subsequently, the beverage is packed in a container, and subjected to sterilization step, to give an intended nonalcoholic beer-taste beverage. The collagen peptide may be mixed therewith at any of the timing up to packing.

In a case where a nonalcoholic beer-taste beverage produced without malts as raw materials is produced, first, a liquid sugar containing a carbon source, a nitrogen source as an amino acid-containing material other than barleys or malts, hops, a color pigment, and the like are mixed together in a hot water to prepare a liquid sugar-containing solution. The liquid sugar-containing solution is boiled. When hops are used as raw materials, hops may be mixed with the liquid sugar-containing solution during boiling but not before the start of the boiling. A carbon dioxide gas is added to the liquid sugar-containing solution after boiling. Thereafter, a carbonated liquid sugar-containing solution is packed in a container and then subjected to sterilization step, to give an intended nonalcoholic beer-taste beverage. The collagen peptide may be supplied and mixed at any timing up to the packing.

Since the collagen peptide is attributable to give body, it is preferable that a total amount of the extract portion is within a given range, in order to make a refreshing beer-taste beverage. The "amount of extract portion" as used herein, in a case of a beverage having an alcoholicity of 0.005% or more, refers to the number of grams of the extract portion in the Liquor Tax Law of Japan, in other words, nonvolatile components contained in 100 cubic centimeters of the original volume at a temperature of 15 degrees, and in a case of an alcoholic beverage having an alcoholicity of less than 0.005%, the extract portion refers to an extract value (% by weight) in which a degassed sample is measured in accordance with "Beer Analysis Method, 7.2 Extract" as prescribed by Brewery Association of Japan, Brewery Convention of Japan (BCOJ). Of the entire extract portion, the amount of the extract portion originated from barleys such as malts can be obtained by, for example, actually measuring an amount of a total extract portion, and subtracting separately obtained additives and extract portions from other raw materials therefrom.

The term "beer-taste beverage" as used herein refers to a carbonated beverage having a beer-like flavor. In other words, unless specified otherwise, the beer-taste beverage of the present specification embraces all the carbonated beverages having a beer flavor. The present invention is directed to substantially nonalcoholic type beverages among those beverages, and an alcoholicity thereof is 0.005% or less, and preferably substantially containing no alcohols. The beverage of the present invention that substantially does not contain an alcohol (nonalcoholic beverage) does not intend to exclude a beverage containing a very small amount of alcohol to an extent that is undetectable. A beverage of which alcoholicity would be rounded off to 0.0%, and especially a beverage of which alcoholicity is rounded off to 0.00%, is embraced in the nonalcoholic beverage of the present invention. The kinds of the beer-taste beverage of the present invention include, for example, nonalcoholic beer-taste beverages, beer-taste refreshing beverages, and the like. Here, the term "alcoholicity (alcohol content)" as used herein means the content of ethanol, but an aliphatic alcohol is not included therein.

The alcoholicity of the beer-taste beverage of the present invention means a content (v/v %) of an alcoholic content of the beverage, and the alcoholicity can be measured by any of known methods. For example, the alcoholicity can be measured with an oscillating densitometer. Specifically, a sample in which a carbon dioxide gas is degassed from a beverage by filtration or ultrasonication is prepared, and the sample is distilled with direct flame, and a density of the distillated solution obtained is measured at 15° C., and the alcoholicity can be converted and obtained from "Table 2 Alcoholic Content and Density (15° C.) and Specific Gravity (15/15° C.) Conversion Table" which is an annex to Internal Revenue Bureau, Specified Analysis Method (2007 Internal Revenue Bureau Order No. 6, revised Jun. 22, 2007). In a case of a low concentration with an alcoholicity of less than 1.0%, a commercially available alcohol measurement instrument or gas chromatography may be used.

An aliphatic alcohol may be added to the beer-taste beverage according to the present invention, from the viewpoint of giving a liquor-taste. The aliphatic alcohol is not particularly limited so long as it is a known one, and an aliphatic alcohol having 4 to 5 carbon atoms is preferred. In the present invention, preferred aliphatic alcohols include aliphatic alcohols having 4 carbon atoms such as 2-methyl-1-propanol and 1-butanol; and aliphatic alcohols having 5 carbon atoms such as 3-methyl-1-butanol, 1-pentanol, and 2-pentanol. These aliphatic alcohols can be used alone or in a combination of two or more kinds. The content of the aliphatic alcohol having 4 to 5 carbon atoms is preferably from 0.0002 to 0.0007% by mass, and more preferably from 0.0003 to 0.0006% by mass. In the present specification, the content of the aliphatic alcohol can be measured by using a headspace gas chromatography.

(Calories)

It is desired that the beer-taste beverage according to the present invention is low in calories, matching with the favoring of low-calorie diets of the recent years. Therefore, the beer-taste beverage of the present invention has the number of calories of preferably less than 5 kcal/100 mL, more preferably less than 4 kcal/100 mL, and even more preferably less than 3 kcal/100 mL.

The number of calories included in a beverage is basically calculated in accordance with "Method for Analyzing and the like Nutrient Ingredients etc. in Nutritional Labelling Standards" published in association with the Health Promotion Act. In other words, in principle, the number of calories can be calculated as a total sum of the amount of the various nutritional components quantified multiplied by an energy conversion coefficient of each component (protein: 4 kcal/g, fat: 9 kcal/g, saccharide: 4 kcal/g, dietary fibers: 2 kcal/g, alcohol: 7 kcal/g, or organic acid: 3 kcal/g). For details, please see "Method and the like for Analyzing Nutrient Ingredients etc. in Nutritional Labelling Standards."

Specific measurement methods for the amounts of each of nutritional components contained in a beverage may be in accordance with various methods of analyses described in the Health Promotion Act, "Method and the like for Analyzing Nutrient Ingredients etc. in Nutritional Labelling Standards." Alternatively, if requested to Incorporated Foundation, Japan Food Research Laboratories, one can know the calories and/or each of amounts of nutritional components.

(Saccharides)

The saccharides as referred to in the present invention refer to saccharides based on the Nutritional Labelling Standards for Foods (2003 Ministry of Health, Labour, and Welfare, Announcement No. 176). Specifically, the saccharides are a group of foods from which proteins, fats, dietary fibers, ashes, alcohols, and water are excluded. In addition, the amount of saccharides in the foods is calculated by deduction of the amounts of proteins, fats, dietary fibers, ashes, and water from the weight of the above foods. In this case, the amounts of proteins, fats, dietary fibers, ashes, and water are measured by a method set out in the Nutrition Labelling Standards. Specifically, the amount of protein is measured by nitrogen quantification conversion method; the amount of fat is measured by an ether extraction method, a chloroform-methanol liquid mixture extraction method, a Gerber method, an acid decomposition method or a Roese-Gottlieb method; the amount of dietary fibers is measured by high-performance liquid chromatography or Prosky method; the amount of ashes is measured by a method of ashing with magnesium acetate, a direct ashing method, or a method of ashing with sulfuric acid; and the amount of water is measured by Karl-Fischer method, a method using a drying aid, a vacuum thermal drying method, an atmospheric thermal drying method, or a plastic film method.

It is desired that the beer-taste beverage according to the present invention is low in saccharides, matching the low carbohydrate diet favors of the recent year. Therefore, the content of the saccharide of the beer-taste beverage of the present invention is preferably less than 0.5 g/100 mL, more preferably 0.4 g/100 mL or less, and even more preferably 0.3 g/100 mL or less. In addition, although the lower limit of the content is not particularly set, the content is usually 0.1 g/100 mL or so, and, for example, the content may be 0.15 g/100 mL or more, or may be 0.2 g/100 mL or more.

(Hops)

In the beer-taste beverage of the present invention, hops can be used as a part of the raw materials. Since the flavor tends to resemble beer, it is desired that hops are used in a part of the raw materials. When hops are used, usual pellet hops, powder hops and hop extracts usable in the production of beer and the like can be appropriately selected and used in accordance with the desired flavor. In addition, hop processed products such as isomerized hops and reduced hops may be used. The hops in the present invention embrace those products. Also, the amount of the hops is, but not particularly limited to, typically from 0.0001 to 1% by weight or so, based on the entire amount of the beverage.

(Other Raw Materials)

In the present invention, other raw materials may be used as occasion demands within the range that would not inhibit the effects of the present invention. For example, a sweetener (including a high-intensity sweetener), a flavor, an yeast extract, a colorant such as a caramel pigment, vegetable extracted saponin-based material such as soybean saponin or quillai saponin, a vegetable protein such as maize or soybeans, and a peptide-containing product, a proteinaceous material such as bovine serum albumin, dietary fibers (hardly digestible dextrin, soybean dietary fibers, etc.), a seasoning such as amino acids, or an antioxidant such as ascorbic acid can optionally be used within the range that would not inhibit the effects of the present invention.

Thus, the beer-taste beverage of the present invention is obtained. The pH of the beer-taste beverage of the present invention may be a pH of 3 or more and 4 or less, preferably a pH of 3.0 or more, more preferably a pH of 3.6 or more. In addition, the pH is preferably a pH of 4.0 or less, and more preferably a pH of 3.8 or less.

(Container-Packed Beverage)

The beer-taste beverage of the present invention can be packed into a container. The shapes of the containers are not limited in any manners, and the beer-taste beverage can be packed into a tightly sealed container such as a glass bottle, a can, a barrel, or a plastic bottle, whereby a beverage contained in a container can be provided.

EXAMPLES

The present invention will be specifically described hereinbelow by the Examples, without intending to limit the scope of the present invention to the following Examples.

<Evaluation of Extract Portion>

In Examples, the amount of the extract portion in the beverage was evaluated in accordance with the following method. Specifically, the extraction portion was measured in accordance with Beer Analysis Method, 7.2 Extract as prescribed by BCOJ. A specific gravity at 20° C. was measured with an oscillating densitometer, and an extract portion was obtained from the annexed extract table. The amount of the extract portion originated from barleys (malts) was calculated by subtracting the extract portions of the additives and other raw materials separately obtained from a total amount of the extract portion.

<Measurement of Content of Aliphatic Alcohol>

The content was measured using a headspace gas chromatography.

<Evaluation of Calories>

The calories were calculated in accordance with "Method and the like for Analyzing Nutrient Ingredients etc. in the Nutritional Labelling Standards" published in association with the Health Promotion Act.

<Evaluation of Saccharides>

In the measurement of saccharides, a calculation formula according to the Nutrition Labelling Standards (2003 Ministry of Health, Labour, and Welfare, Announcement No. 176) was used.

<Evaluation of Flavor>

In the present specification, the flavor of the beer-taste beverage was evaluated by a sensory test according to a scoring method. Six specialist panelists were asked to evaluate the beer-like flavors on a flavor balance of a first half of initial tastes after about 0 to about 0.5 seconds from holding in the mouth, a flavor balance of a second half of the initial tastes after about 0.5 to 1 second from holding, and further an overall evaluation, with Score 5 as a full score. An average score of the evaluation score was calculated, where "very excellent"=Score 5,
"excellent"=Score 4,
"fair"=Score 3,
"somewhat poorer"=Score 2, and
"poor"=Score 1.

An average score of Score 3.0 or higher is preferred.

Examples 1 to 7 and Comparative Examples 1 to 5

Production Example 1 of Nonalcoholic Beer-Taste Beverage

Beer-taste beverages listed in Tables 1 and 2 were prepared as follows.

Specifically, malts were ground to an appropriate granularity, the ground malts were supplied into a mash tun, and 120 L of hot water was added thereto, to prepare a mash at about 50° C. After holding the mash at 50° C. for 30 minutes, the temperature was gradually raised, and saccharification was carried out at a temperature of 65° to 72° C. for 60 minutes. The mash in which the saccharification had been completed was heated to 77° C., transferred to a wort filtration tank and filtered, to obtain a filtrate.

A part of the filtrate obtained was taken, and hot water was added to the part of filtrate, at which time a mixing proportion of the filtrate to the hot water was regulated so that the amount of the extract portion would be an intended value at the completion of boiling. The production scale was 100 L, and hops were added in an amount of about 100 g, and a mixture was boiled at 100° C. for 80 minutes. The draff was separated from the boiled liquid, the boiled liquid was cooled to about 2° C., and a wort was then diluted. To the dilution, a collagen peptide (manufactured by Nitta Gelatin Inc., product name: SCP5100, molecular weight: 5,100) was added so as to have a content as listed in each of Tables 1 and 2, and in Example 6 dietary fibers (manufactured by Matsutani Chemical Industry Co., Ltd., product name: E-Fiber) were added so as to have a content as listed in Table 2, in each of Example 7 and Comparative Example 5, sweeteners were additionally added so as to each have a content as listed in Table 2. Next, to all of samples, an antioxidant, a flavor, and optionally a caramel pigment were each added in a proper amount. An acidulant was added so as to have a pH as listed in each of Tables 1 and 2, and a commercially available iso-α acid was then added in a product concentration so as to have a content as listed in each of Tables 1 and 2, and the liquid mixture was stored for about 24 hours. During the storage, a carbon dioxide gas was added in a proper amount. Thereafter, the liquid mixture was subjected to steps of filtration, bottling in a vessel, and sterilization (heated at 65° C. or higher for 10 minutes), to give a beer-taste beverage. Here, the content of the aliphatic alcohols having 4 carbon atoms and 5 carbon atoms in the beer-taste beverage obtained was 0.000467% by mass.

Example 8 and Comparative Example 6

Production Example 2 of Nonalcoholic Beer-Taste Beverage

A beer-taste beverage as listed in Table 3 was prepared as follows.

Specifically, hops were added so as to have the same proportions as in Example 1 and boiled in the same manner, instead of using a wort in Example 1. Dietary fibers (manufactured by Matsutani Chemical Industry Co., Ltd., product name: E-Fiber) were added so as to have a content as listed in Table 3 to a liquid sugar-containing solution in which the amount of the extract portion was previously regulated to reach an intended value at the completion of boiling to prepare a solution. Next, a collagen peptide (manufactured by Nitta Gelatin Inc., product name: SCP5100, molecular weight: 5,100) was added to the solution so as to have a content as listed in Table 3, and an antioxidant, a flavor, and optionally a caramel pigment were each added thereto in a proper amount. An acidulant was added so as to have a pH as listed in Table 3, a commercially available iso-α acid was added such that a product concentration has a content as listed in Table 3, and the mixture was stored for about 24 hours. During the storage, a carbon dioxide gas was added in a proper amount. Thereafter, the liquid mixture was subjected to steps of filtration, bottling in a vessel, and sterilization (heated at 65° C. or higher for 10 minutes), to give a beer-taste beverage. Here, the content of the aliphatic alcohols having 4 carbon atoms and 5 carbon atoms in the beer-taste beverage obtained was 0.000467% by mass.

The resulting beer-taste beverages were evaluated for flavor in accordance with the above scoring method. The results are shown in Tables 1 to 3.

TABLE 1

|  | Comp. Ex. 1 | Ex. 1 | Ex. 2 | Ex. 3 | Comp. Ex. 2 | Comp. Ex. 3 |
|---|---|---|---|---|---|---|
| Iso-α Acid (% by mass) | $0.5 \times 10^{-3}$ | $1.0 \times 10^{-3}$ | $1.5 \times 10^{-3}$ | $3.0 \times 10^{-3}$ | $3.5 \times 10^{-3}$ | $1.5 \times 10^{-3}$ |
| Carbon Dioxide Gas (w/w %) | 0.5 | 0.5 | 0.5 | 0.5 | 0.5 | 0 |
| Collagen Peptide (mg/100 mL) | 571 | 571 | 571 | 571 | 571 | 571 |
| Hydroxyproline (mg/100 mL) | 61.1 | 61.1 | 61.1 | 61.1 | 61.1 | 61.1 |
| Acidulant (calculated as citric acid, ppm) | 1,792 | 1,792 | 1,792 | 1,792 | 1,792 | 1,792 |
| Iso-α Acid/Acidulant (Mass Ratio) | 0.0028 | 0.0056 | 0.0084 | 0.0167 | 0.0195 | 0.0084 |
| pH | 4.0 | 4.0 | 4.0 | 4.0 | 4.0 | 4.0 |
| Extract Portion (w/w %) | 0.80 | 0.80 | 0.80 | 0.80 | 0.80 | 0.80 |
| Alcohol Content (w/w %) | 0.00 | 0.00 | 0.00 | 0.00 | 0.00 | 0.00 |
| Calories (kcal/100 mL) | 4 | 4 | 4 | 4 | 4 | 4 |
| Saccharides (g/100 mL) | 0.2 | 0.2 | 0.2 | 0.2 | 0.2 | 0.2 |
| Flavor Balance of First Half of Initial Tastes | 1.8 | 3.7 | 4.3 | 3.8 | 3.3 | 1.7 |
| Flavor Balance of Second Half of Initial Tastes | 2.3 | 3.3 | 4.0 | 3.2 | 2.0 | 2.5 |
| Overall Evaluation of Flavors | 1.8 | 3.7 | 4.3 | 3.3 | 2.2 | 1.8 |

TABLE 2

|  | Ex. 4 | Comp. Ex. 4 | Ex. 5 | Ex. 6 | Ex. 7 | Comp. Ex. 5 |
|---|---|---|---|---|---|---|
| Iso-α Acid (% by mass) | $1.5 \times 10^{-3}$ | $3.5 \times 10^{-3}$ | $1.5 \times 10^{-3}$ | $1.5 \times 10^{-3}$ | $1.5 \times 10^{-3}$ | $3.5 \times 10^{-3}$ |
| Carbon Dioxide Gas (w/w %) | 0.5 | 0.5 | 0.5 | 0.5 | 0.5 | 0.5 |
| Collagen Peptide (mg/100 mL) | 571 | 571 | 286 | 571 | 571 | 571 |
| Hydroxyproline (mg/100 mL) | 61.1 | 61.1 | 30.6 | 61.1 | 61.1 | 61.1 |
| Acidulant (calculated as citric acid, ppm) | 2,842 | 2,842 | 1,033 | 1,792 | 1,792 | 1,792 |
| Iso-α Acid/Acidulant (Mass Ratio) | 0.0053 | 0.0123 | 0.0145 | 0.0084 | 0.0084 | 0.0195 |
| pH | 3.0 | 3.0 | 4.0 | 4.0 | 4.0 | 4.0 |
| Dietary Fibers (w/w %) | — | — | — | 0.2 | — | — |
| Acesulfam Potassium (ppm) | — | — | — | — | 30 | 30 |
| Sucralose (ppm) | — | — | — | — | 10 | 10 |
| Extract Portion (w/w %) | 0.83 | 0.83 | 0.54 | 0.80 | 0.80 | 0.80 |
| Alcohol Content (w/w %) | 0.00 | 0.00 | 0.00 | 0.00 | 0.00 | 0.00 |
| Calories (kcal/100 mL) | 4 | 4 | 4 | 4 | 4 | 4 |
| Saccharides (g/100 mL) | 0.2 | 0.2 | 0.2 | 0.2 | 0.2 | 0.2 |
| Flavor Balance of First Half of Initial Tastes | 3.2 | 3.0 | 3.8 | 4.0 | 4.2 | 3.2 |
| Flavor Balance of Second Half of Initial Tastes | 3.2 | 2.8 | 3.8 | 3.8 | 4.0 | 2.8 |
| Overall Evaluation of Flavors | 3.2 | 2.8 | 3.7 | 3.8 | 4.0 | 2.5 |

TABLE 3

|  | Ex. 8 | Comp. Ex. 6 |
|---|---|---|
| Iso-α Acid (% by mass) | $1.5 \times 10^{-3}$ | $0.5 \times 10^{-3}$ |
| Carbon Dioxide Gas (w/w %) | 0.5 | 0.5 |
| Collagen Peptide (mg/100 mL) | 571 | 571 |
| Hydroxyproline (mg/100 mL) | 61.1 | 61.1 |
| Acidulant (calculated as citric acid, ppm) | 1,792 | 1,792 |
| Iso-α Acid/Acidulant (Mass Ratio) | 0.0084 | 0.0028 |
| pH | 4.0 | 4.0 |
| Dietary Fibers (w/w %) | 0.2 | 0.2 |
| Extract Portion (w/w %) | 0.80 | 0.80 |
| Alcohol Content (w/w %) | 0.00 | 0.00 |
| Calories (kcal/100 mL) | 4 | 4 |
| Saccharides (g/100 mL) | 0.2 | 0.2 |
| Flavor Balance of First Half of Initial Tastes | 4.0 | 1.5 |
| Flavor Balance of Second Half of Initial Tastes | 4.0 | 1.3 |
| Overall Evaluation of Flavors | 4.0 | 1.8 |

As is clear from Tables 1 to 3, Comparative Example 3 without containing a carbon dioxide gas had low evaluations in both the first half of the initial tastes and the second half of the initial tastes, and also low overall evaluation of flavors. In addition, Comparative Examples 1 and 6 where the content of the iso-α acid is $0.5 \times 10^{-3}$% by mass had low evaluations in both the first and second halves of the initial tastes, and also low overall evaluation of flavors. Further, Comparative Examples 2, 4, and 5 where the content of the iso-α acid is $3.5 \times 10^{-3}$% by mass had a low evaluation of the second half of the initial tastes, and also low overall evaluation. On the other hand, the beer-taste beverages of Examples had excellent balance in flavors in both the first half of the initial tastes and the second half of the initial tastes, regardless of use or lack of use of raw material malts, and also high overall evaluation.

INDUSTRIAL APPLICABILITY

The beer-taste beverage of the present invention has excellent initial tastes of sour taste and bitterness and has beer-like taste, so that the beer-taste beverage can provide a new taste as luxury products.

The invention claimed is:

1. A beer-taste beverage which is substantially nonalcoholic, comprising:
   (A) a collagen peptide having an average molecular weight of from 500 to 8,000, wherein the (A) collagen peptide comprises (A') hydroxyproline,
   (B) a carbon dioxide gas,
   (C) an iso-α acid, and
   (D) an acidulant,
   wherein a pH is 3 or more and 4 or less, and wherein the content of the collagen peptide is from 280 to 1,800 mg/100 mL, and wherein the content of the iso-α acid is from $1.0 \times 10^{-3}$ to $3.0 \times 10^{-3}$% by mass.

2. The beer-taste beverage according to claim 1, wherein the content of (A') hydroxyproline is from 30 to 193 mg/100 mL.

3. The beer-taste beverage according to claim 2, wherein the (A') hydroxyproline comprises a component originated from the (A) collagen peptide.

4. The beer-taste beverage according to claim 1, wherein the content mass ratio of (C) the iso-α acid to (D) the acidulant [(C)/(D)] is from 0.003 to 0.030.

5. The beer-taste beverage according to claim 1, which has calories of less than 5 kcal/100 mL.

6. The beer-taste beverage according to claim 1, wherein the content of a saccharide is less than 0.5 g/100 mL.

7. The beer-taste beverage according to claim 1, wherein the content of the aliphatic alcohols having 4 carbon atoms and 5 carbon atoms is from 0.0002 to 0.0007% by mass.

* * * * *